Figure 1:
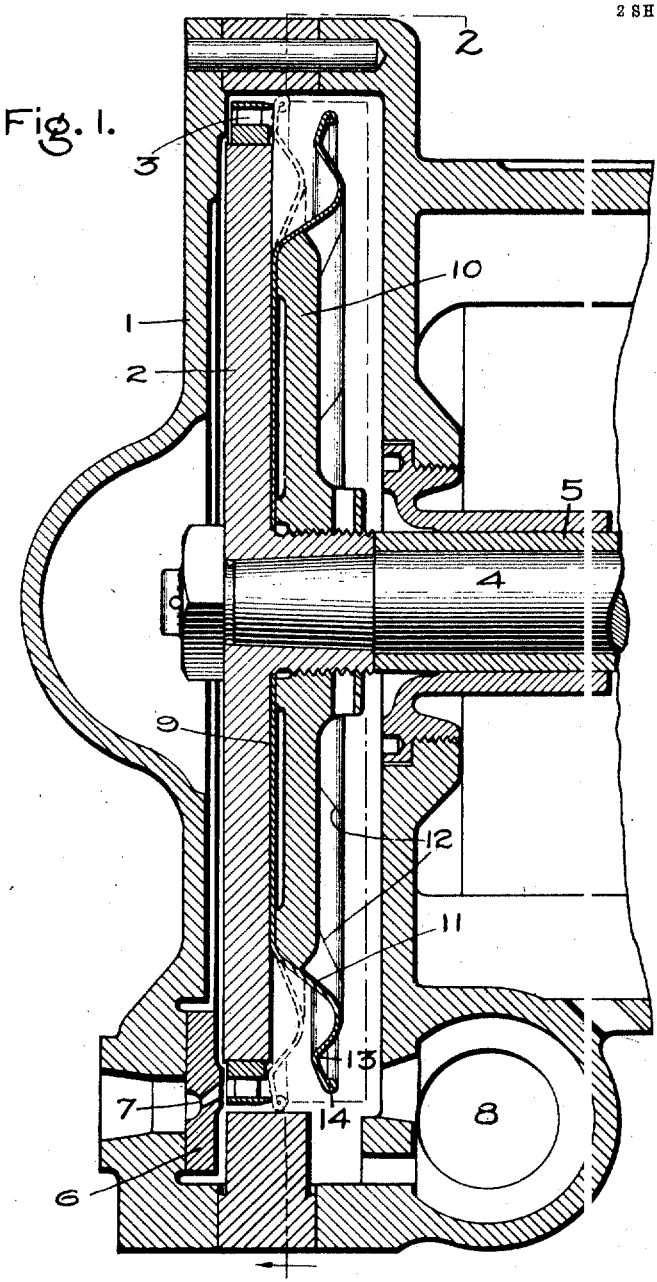

L. C. LOEWENSTEIN.
GOVERNING MECHANISM FOR TURBINES.
APPLICATION FILED APR. 14, 1909.
1,008,550.
Patented Nov. 14, 1911.
2 SHEETS—SHEET 2.
Fig. 2.
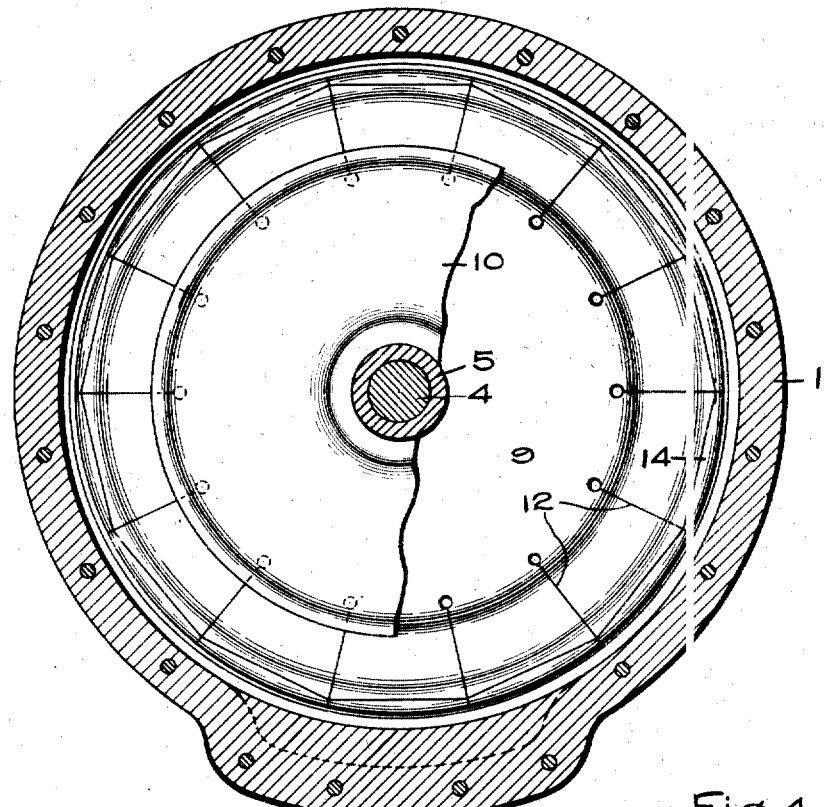
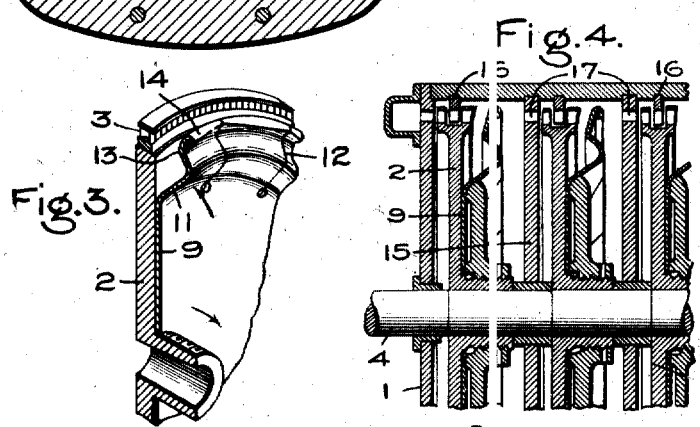
Witnesses:
Marcus L. Byng.
J. Ellis Glim
Inventor,
Louis C. Loewenstein,
by
Att'y.

UNITED STATES PATENT OFFICE.

LOUIS C. LOEWENSTEIN, OF LYNN, MASSACHUSETTS, ASSIGNOR TO GENERAL ELECTRIC COMPANY, A CORPORATION OF NEW YORK.

GOVERNING MECHANISM FOR TURBINES.

1,008,550.  Specification of Letters Patent.  Patented Nov. 14, 1911.

Application filed April 14, 1909. Serial No. 489,783.

*To all whom it may concern:*

Be it known that I, LOUIS C. LOEWENSTEIN, a citizen of the United States, residing at Lynn, in the county of Essex and State of Massachusetts, have invented certain new and useful Improvements in Governing Mechanism for Turbines, of which the following is a specification.

For various purposes and especially for supplying current to electric headlights, it is desirable to employ small turbine driven electric generators and to operate them at relatively high speeds. In a turbo-generator set of this character the problem of properly governing the turbine is a serious one. The principal difficulties heretofore experienced have been, first, in transmitting motion from the rotating speed governor of the turbine to its regulating valve, second, in properly lubricating the parts employed to transmit said motion, and third, in balancing the speed governor.

The object of my invention is to overcome the objections above noted and also to provide a governing mechanism for a turbine which is extremely simple and reliable in operation and which is cheap to manufacture.

In carrying out my invention I combine the speed governor and regulating valve in a single or unitary structure and mount said structure on the turbine rotor or its shaft, thereby dispensing with all intermediate mechanical connections or parts that require lubrication and attention. This also materially reduces the number of parts, and the few parts used are of a simple and rugged nature. In the present embodiment of my invention the said structure comprises an elastic disk whose peripheral portion is capable of assuming different positions and which acts as a valve. Owing to the shape of the disk and to the elasticity of the metal forming, the peripheral portion thereof it tends at all times when in ordinary service to remain in a certain position which permits free flow of motive fluid through the turbine. As the speed rises above a predetermined value, the centrifugal force thus created overbalances the force due to the elasticity of the metal forming the disk and causes the disk or some portion thereof to move in a direction to oppose or restrict the flow of motive fluid, thereby keeping the speed of the rotor within the desired limits.

The particular location of said structure within the wheel casing can be varied to suit the requirements.

Steam or other elastic fluid is admitted to the turbine through an unrestricted port, and the valve or disk which is wholly within the casing and rotates with the bucket wheel or rotor determines by its position the amount of fluid that can flow through the wheel by varying the resistance of its path, the position of the disk or valve being determined by the speed of the rotor.

I may utilize my invention in a single stage or in a multi-stage turbine, and in the latter case, some or all of the stages may be provided with my improved governing mechanism.

In addition to combining the valve and speed governor in a single structure I may if desired utilize said structure as the moving element of a brake which when the centrifugal force reaches a predetermined value engages a stationary braking surface to prevent a further increase in speed, thus combining both effects, that of restricting motive fluid flow and of mechanically braking the speed.

In the accompanying drawings which are illustrative of my invention, Figure 1 is an axial section of a jet or impact turbine of the Curtis type; Fig. 2 is a cross-section of the same taken on line 2—2 of Fig. 1; Fig. 3 is a perspective detail of the bucket wheel and governing means carried thereby; and Fig. 4 is a sectional view showing my invention applied to a multi-stage turbine.

1 indicates the casing of the turbine, and contained therein is a wheel 2 having a single row of radial buckets 3, although a greater number of rows may be provided if desired. The wheel is mounted on a shaft 4 carried in a bearing 5, the latter being supported by the wheel casing. Steam is admitted to the bucket wheel from an unrestricted admission port by a nozzle 6 which may have one or more sections or passages 7. The passage or passages may be expanding or non-expanding in character as circumstances require. The exhaust from the turbine is carried off from the exhaust port 8 by a suitable conduit. The portion of the casing immediately surrounding the bucket wheel is turned or finished concentric with the shaft axis in order to coöperate with the governing means to form a brake as will appear later. This stationary braking surface may be formed on the wheel casing itself or on a separate member carried by the casing. The braking feature is a secondary part of my invention and need not in all cases be used, but I have found it to be desirable in practice.

Mounted to revolve with the wheel is a thin sheet metal disk 9 that acts as a speed governor and also as a valve. The disk or valve may also be employed as the moving element of a brake to prevent the speed of the bucket-wheel from becoming excessive and bursting due to centrifugal strains. The disk can be secured in any suitable manner. In the present embodiment of my invention the body of the disk is clamped to that of the wheel by an annular nut 10 having a screw-threaded opening to receive the correspondingly threaded portion of the wheel hub. The peripheral portion of the disk 9 is bent, curved or directed outwardly from the body of the wheel as indicated at 11, so that as the disk is revolved the rim or peripheral portion will, due to centrifugal force, change its position in such manner and direction as to throttle the passage of steam through the turbine, the said throtling taking place between the wheel and exhaust port 8. In the present embodiment of my invention it changes its position not only by moving toward the wheel but by enlarging its diameter.

The rim 11 of the disk i. e., that part or portion outside of the periphery of the annular nut 10 is elastic and is suitably shaped before being mounted in place. This means that the centrifugal force tending to move the disk or valve is opposed by a force due to the elasticity of the metal of the disk, so that for every speed condition there is a given position of the disk. As a result, as the speed and therefore the centrifugal force increases, due to a change in operating conditions, the valve or disk will change its position and in so doing oppose to a greater or less extent the free passage of steam through the buckets by moving toward the wheel. This action continues until the steam input and load balance, when the relative position of the parts will be fixed. Conversely, if the speed and hence the centrifugal force decreases, the peripheral portion of the disk will change its position by moving away from the wheel, thus permitting more steam to flow through the bucket wheel to the exhaust port.

In order to increase the sensitiveness of the valve or disk, it may be provided with radial slots 12 or otherwise weakened at certain points.

The rim 11 of the disk or valve is provided with an annular projection 13 which when the speed of the turbine shaft increases to a certain predetermined and abnormal value, due to any cause, strikes the side of the wheel or the bucket bases, while the portion of the disk immediately surrounding said projection strikes the cover of the wheel buckets. It will thus be seen that portions of the bucket wheel form an annular seat for the valve. The action just described will reduce the passage of steam through the turbine to a minimum. Such a condition is present when the turbine drives an electric generator and the load is suddenly removed from the latter. The parts must be so constructed and arranged that the total amount of steam which can pass the disk or valve when seated or in its closed position, i. e., when engaging the wheel, is insufficient to drive the latter above the speed that is considered safe for that particular machine, or above any predetermined speed. For intermediate load values the valve or disk 9 will assume an intermediate position between that indicated by the full and dotted lines, the exact position being determined by the amount of the load on the turbine and hence its speed and by the pressure of the steam. Assuming a constant steam pressure, the disk 9 will move toward the wheel as the load decreases and away from it as the load increases.

The disk may with advantage be provided with a thickened portion or bead 14 that forms a weight or mass to increase its effective action. This bead in addition to acting as a weight will, when the latter is fully enlarged, expanded or moved to its final position, act as a brake by engaging the finished inner surface of the casing. The braking action only takes place when the valve or disk fails to reduce the speed of the wheel quickly enough or when for any reason the speed of the wheel continues to increase after the peripheral portion of the disk has covered the exhaust side of the wheel buckets. As soon as the speed is sufficiently reduced, however, the bead will move away from its coöperating braking surface and permit the valve to resume complete control. When the disk is slotted, as shown, there will usually be a certain small amount of steam passing through the turbine, even when the disk is firmly held against the wheel by centrifugal force, but the brake will prevent the turbine from running away in the event that the steam thus passing through the turbine is more than enough to drive the turbine at no-load.

In Fig. 4 is shown a multi-stage turbine comprising a casing 1 that is divided by diaphragms 15 into wheel compartments or stages. Each stage has a wheel 2 provided with two rows of buckets. Between each two rows of wheel buckets is a segmental or complete row of stationary intermediate buckets 16. Steam is admitted by the nozzle 6 to the first stage, and between stages the fluid is conveyed by stage nozzles 17. Mounted to revolve with the wheels are flexible disks 9 of the character and construction previously described. The action of these disks is the same as that already referred to although some of them work on lower pressure fluid than the others.

Instead of causing the disk to move toward the wheel as the speed increases, its position may be reversed, so that the peripheral portion will move toward and decrease the effective area of the exhaust opening. The effect being the same in all cases.

In the event that the efficiency of the turbine is not so important, I may locate the valve or disk 9 between the casing and wheel on the inlet side and cause the disk to act on the steam before it enters the bucket wheel.

Instead of utilizing my invention as a governing mechanism for regulating the turbine under normal conditions, I may utilize it solely as an emergency means for preventing the speed from rising above a predetermined value.

I have shown my invention in connection with a turbine of the Curtis type but I do not wish to be understood as limiting myself to it as the invention is capable of wider application.

The great advantages of my improved governing mechanism reside in its extreme simplicity, reliability, low cost of construction and reduced cost of maintenance. The invention is particularly well adapted for use with small turbines arranged to drive electric generators for lighting purposes, and particularly for locomotive headlights. Turbines employed for the latter purpose are exposed to the weather, are subjected to the variations and pounding of the locomotive, and are given as a rule the minimum amount of care. I may, however, use my improved governing mechanism for turbines driving various kinds of apparatus.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is,—

1. A rotor carrying buckets with a casing therefor having admission and exhaust ports, in combination with a unitary structure driven by the rotor which is responsive to speed changes and acts as a centrifugal speed governor and as a regulating valve to control the passage of motive fluid from the outlets of said buckets to the exhaust port.

2. In combination, a rotor carrying buckets, a casing therefor having admission and exhaust ports, and a means revolving with the rotor which has a portion fixed to said rotor and an elastic portion which changes its position relative to said buckets with speed changes and thereby serves to vary the amount of motive fluid passing through said rotor.

3. In combination, a rotor carrying buckets, a casing therefor having admission and exhaust ports, and an elastic device driven by the rotor which is sensitive to changes in centrifugal force, one part of said device by its movements acting to throttle the outlets of the rotor buckets to vary the amount of motive fluid passing from the buckets to the exhaust port.

4. In combination, a rotor carrying buckets, a casing therefor having admission and exhaust ports, and an elastic disk mounted to revolve with the rotor, the peripheral portion of said disk acting to throttle the outlets of the rotor buckets and thereby control the passage of motive fluid from the buckets to the exhaust port.

5. In combination, a rotor carrying buckets, a casing therefor having admission and exhaust ports, and an annular means revolving with the rotor which changes its diameter with speed changes and in so doing varies the amount of motive fluid passing through the buckets of said rotor.

6. In combination, a rotor carrying buckets, a casing therefor having admission and exhaust ports, and a flexible metal disk whose diameter decreases with a decrease in speed for increasing the amount of motive fluid passing through the rotor and increases in diameter with increase in speed to decrease the amount of motive fluid passing through the rotor.

7. In combination, a rotor carrying buckets, a casing therefor having admission and exhaust ports, and an elastic means located on the rotor adjacent the buckets and within the casing which means moves toward and from the outlets of the buckets with changes in speed of the rotor for varying the resistance to the passage of motive fluid between the rotor and the exhaust port.

8. In combination, a rotor carrying buckets, a casing therefor having admission and exhaust ports, and a flexible disk which changes its diameter with speed changes of the rotor for varying the resistance to the escape of motive fluid through the exhaust port.

9. In combination, a rotor carrying buckets, a casing therefor having unrestricted admission and exhaust ports, and a means located within the casing and revolving with the rotor for controlling the freedom with which motive fluid can pass through the rotor to the exhaust port, said means having a portion fixed to the rotor and an elastic portion integral with the first portion which is arranged adjacent the buckets and changes its position relative to said buckets with speed changes.

10. A rotor carrying buckets, a casing therefor having admission and exhaust ports, in combination with an elastic disk located within the casing whose peripheral portion acts as a valve and is bent away from its seat, and means for uniting the disk and rotor to cause simultaneous rotation.

11. A rotor carrying buckets, a casing therefor having admission and exhaust ports, and a braking member, in combination with a unitary structure driven by the rotor which acts as a centrifugal speed governor and a regulating valve to control the action of the motive fluid on the buckets, and as a movable braking element which engages said member under certain conditions.

12. In combination, a rotor carrying buckets, a casing therefor having admission and exhaust ports, and a means driven by the rotor which changes its position with changes in speed of the rotor for regulating the passage of motive fluid through the turbine, and which coöperates with a fixed part of the turbine to act as a brake for the rotor when the speed increases above a predetermined value.

13. In combination, a rotor carrying buckets, a casing therefor having admission and exhaust ports, and a means driven by the rotor which acts to regulate the passage of motive fluid under normal conditions and which enlarges in diameter and coöperates with a stationary surface when the speed exceeds a certain amount.

14. In combination, a rotor carrying buckets, a casing for the rotor having admission and exhaust ports, and a means mounted on the rotor adjacent the buckets which acts as a valve to throttle the passage of motive fluid through the buckets for normal operating conditions and which acts as a brake by engaging the casing under abnormal operating conditions.

15. A rotor carrying buckets, a casing therefor divided into stages, each stage containing a part of the rotor, and valves made of elastic disks in two or more of the stages, each of which is individually responsive to changes in centrifugal force acting on its mass and throttles the outlets of the buckets of one stage to thereby regulate the flow of motive fluid through said stage and the supply to the next portion of the turbine.

16. In combination, a rotor carrying buckets, and a thin metal ring secured by one edge to the rotor adjacent the buckets which ring moves toward and from said buckets under the influence of centrifugal force as the speed changes and varies the supply of motive fluid for driving the rotor.

17. In combination, a rotor carrying buckets on its periphery, and a thin metal ring secured by one edge to the rotor adjacent the buckets with its outwardly extending portion bent away from said buckets and provided with a series of radial slots, said outer portion moving toward and from the buckets under the influence of centrifugal force as the speed changes to vary the supply of motive fluid for driving the motor.

18. In combination, a rotor carrying buckets, and a thin metal ring secured by its inner edge to the rotor adjacent the buckets with its outer portion arranged at an angle to the axis of the rotor and weighted adjacent its periphery, said outer portion moving toward and from the buckets under the influence of centrifugal force as the speed changes to vary the supply of motive fluid for driving the motor.

19. In combination, a turbine rotor carrying buckets, a casing for the rotor having an admission port for supplying motive fluid to act on the buckets and an exhaust port that receives the exhaust from the buckets, and means for controlling the quantity of motive fluid acting on the rotor which includes an elastic device driven by said rotor that is sensitive to changes in centrifugal force and has a portion that acts upon the motive fluid between the rotor buckets and the exhaust part and is moved in a substantially axial direction under the influence of said force to control the passage of motive fluid from the buckets to the exhaust port.

In witness whereof, I have hereunto set my hand this twelfth day of April, 1909.

LOUIS C. LOEWENSTEIN.

Witnesses:
JOHN A. McMANUS, Jr.,
CHARLES A. BARNARD.